UNITED STATES PATENT OFFICE.

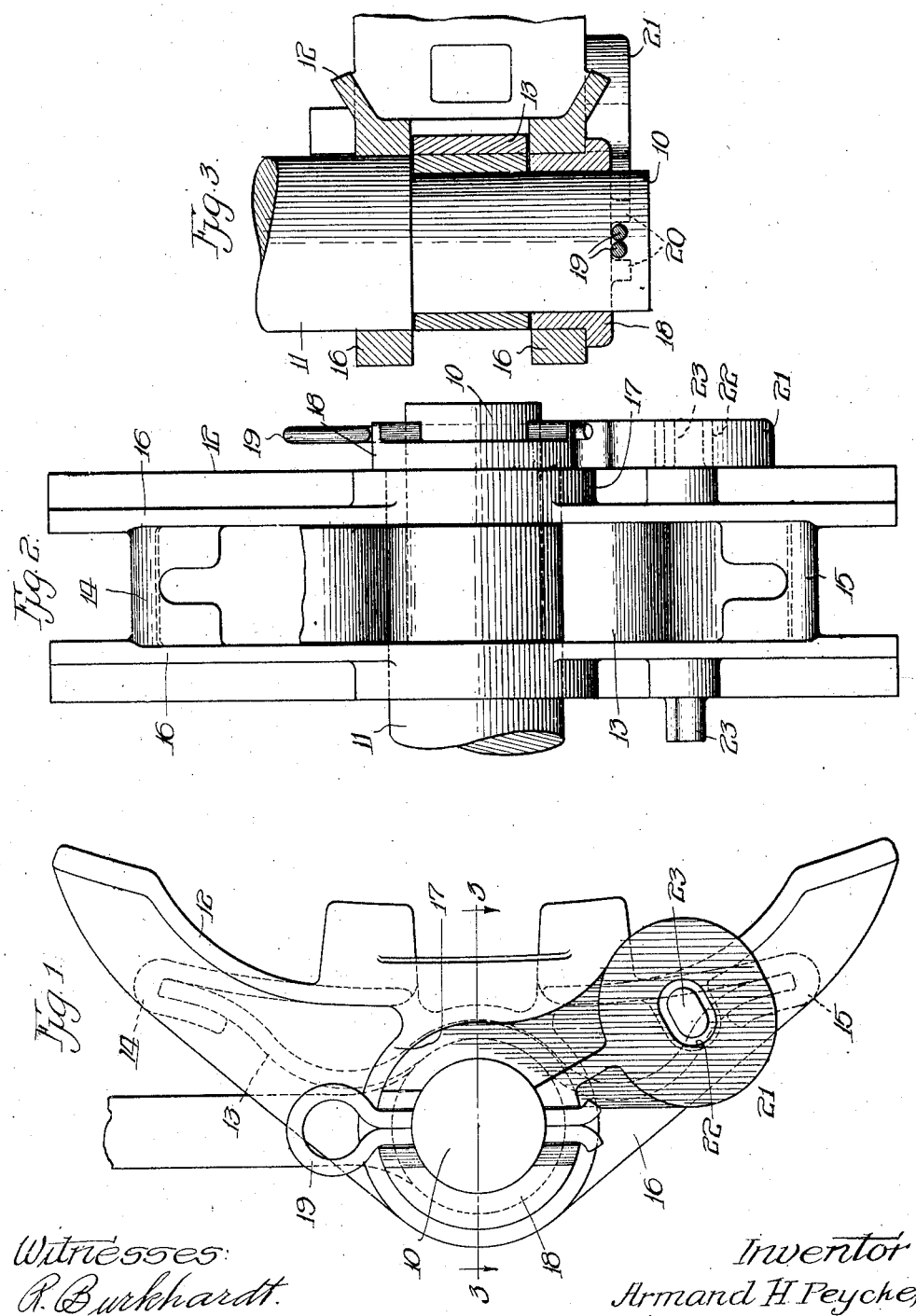

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MEANS.

1,335,190.  Specification of Letters Patent.  Patented Mar. 30, 1920.

Application filed June 19, 1919. Serial No. 305,234.

*To all whom it may concern:*

Be it known that I, ARMAND H. PEYCKE, a citizen of the United States, residing at Chicago, in the county of Cook and State of Illinois, have invented certain new and useful Improvements in Brake Means, of which the following is a specification.

This invention relates to brake means.

The object of the invention is to simplify and improve means for permitting and limiting angular travel of a brake head on its support, the amount of angular travel of the brake head ranging in accordance with wear of the brake shoe and associated wheel.

This and other objects are accomplished by means of the arrangement disclosed on the accompanying sheet of drawings in which:

Figure 1 is a side elevation of a brake head and associated parts embodying my invention.

Fig. 2 is a rear elevation of the same, and

Fig. 3 is a detail sectional view taken in the plane of line 3—3 of Fig. 1.

The various novel features of the invention will be apparent from the following description and drawings and will be particularly pointed out in the appended claims.

Referring to the figures of the drawings it will be noted that I have shown the trunnion of a brake beam, said trunnion being stepped and having a reduced portion 10 and a relatively larger portion 11. Mounted over this trunnion is a brake head 12 which carries a spring 13 anchored between lips 14 and 15 carried at the rear of the brake head, said spring 13 being mounted between the side walls or flanges 16 of the brake head and having a curved portion 17 embracing the lower eye portion of the hanger for yieldably holding the brake head in adjusted position on the trunnion. Mounted over the reduced portion 10 of the trunnion and fitting within one of the side walls 16 of the brake head is a bushing 18 which is fixed to the trunnion 10 by a key 19 which passes through an opening in the trunnion portion 10 and is located within notches formed by projections 20 at one side of the bushing. Formed integrally with the bushing 18 is a depending ear 21 having an elongated opening 22 extending substantially in the arc of a circle struck from the center of the trunnion. This elongated opening 22 receives a projection 23 extending laterally from the associated side of the brake head whereby angular travel of the brake head is limited. The elongated opening 22 is made of the proper length to permit maximum travel, taking into consideration the use of new brake shoes and new wheels and the use of no shoes or worn out shoes and worn wheels. It will be appreciated that the travel of the brake head on the trunnion at all times is yieldably restrained by the spring 13 engaging reduced portion 10 of the trunnion, said spring holding the brake head in adjusted position.

It is my intention to cover all modifications of the invention falling within the spirit and scope of the following claims.

I claim:

1. In brake mechanism, a brake beam having a trunnion, a brake head yieldably mounted thereon for angular movement and having a projection, a member fixed to said trunnion and having an opening therein for the reception of said projection whereby the angular movement of said brake head is limited.

2. In brake mechanism, a brake beam having a trunnion with a reduced portion and a relatively larger portion, a brake head yieldably mounted over said trunnion portions, a bushing mounted upon the reduced portion of said trunnion within a side wall of said head and being fixed to said reduced portion, said bushing member and brake head being relatively movable and having coöperating portions for limiting relatively angular movement.

3. In brake mechanism, a brake beam having a trunnion with a reduced portion and a relatively larger portion, a brake head mounted over said trunnion portions and movable with respect thereto, a spring carried by said head engageable with the reduced portion of the trunnion for yieldably holding the brake head in adjusted position, a bushing mounted over the reduced portion of said trunnion and within one side wall of the brake head, said bushing having an ear portion with an opening therein for receiving a projection on the brake head whereby angular movement of the brake head is limited.

Signed at Chicago, Illinois, this 29th day of May, 1919.

ARMAND H. PEYCKE.